United States Patent
Steimke et al.

(10) Patent No.: US 8,709,229 B2
(45) Date of Patent: Apr. 29, 2014

(54) METHOD TO PREVENT SULFUR ACCUMULATION IN MEMBRANE ELECTRODE ASSEMBLY

(75) Inventors: John L. Steimke, Augusta, SC (US); Timothy J. Steeper, Trenton, SC (US); David T. Herman, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 216 days.

(21) Appl. No.: 12/930,486

(22) Filed: Jan. 7, 2011

(65) Prior Publication Data

US 2011/0180417 A1   Jul. 28, 2011

Related U.S. Application Data

(60) Provisional application No. 61/335,457, filed on Jan. 7, 2010.

(51) Int. Cl.
| | | |
|---|---|---|
| C25B 1/02 | (2006.01) | |
| C25B 1/00 | (2006.01) | |
| C25B 1/04 | (2006.01) | |
| C25B 15/02 | (2006.01) | |

(52) U.S. Cl.
CPC ... *C25B 1/02* (2012.01); *C25B 1/00* (2013.01); *C25B 1/04* (2013.01); *C25B 15/02* (2013.01)
USPC .......................................... 205/637; 205/615

(58) Field of Classification Search
None
See application file for complete search history.

(56) References Cited

U.S. PATENT DOCUMENTS

| | | |
|---|---|---|
| 4,391,682 A | 7/1983 | Struck et al. |
| 7,261,874 B2 | 8/2007 | Lahoda et al. |
| 2007/0007147 A1 | 1/2007 | Lahoda |
| 2009/0000956 A1 | 1/2009 | Weidner et al. |
| 2009/0020436 A1 | 1/2009 | Lahoda et al. |

OTHER PUBLICATIONS

Steimke and Steeper. "Characterization Testing and Analysis of Single Cell SO2 Depolarized Electrolyzer." Dep't of Energy Office of Scientific and Technical Information's Information Bridge. Sep. 15, 2006.*

Steimke, Steeper, Herman, Colon-Mercado, & Elvington. "Method to Prevent Sulfur Accumulation inside Membrane Electrode Assembly." Dep't of Energy Office of Scientific and Technical Information's Information Bridge. Jun. 22, 2009.*

Steimke and Steeper. "Characterization Testing of H2O—SO2 Electrolyzer at Ambient Pressure." Dep't of Energy Office of Scientific and Technical Information's Information Bridge. Aug. 1, 2005.*

(Continued)

*Primary Examiner* — James Lin
*Assistant Examiner* — Ho-Sung Chung
(74) *Attorney, Agent, or Firm* — J. Bennett Mullinax, LLC (57) ABSTRACT

A method of operating a hybrid sulfur electrolyzer to generate hydrogen is provided that includes the steps of providing an anolyte with a concentration of sulfur dioxide, and applying a current. During steady state generation of hydrogen a plot of applied current density versus concentration of sulfur dioxide is below a boundary line. The boundary line may be linear and extend through the origin of the graph with a slope of 0.001 in which the current density is measured in mA/cm2 and the concentration of sulfur dioxide is measured in moles of sulfur dioxide per liter of anolyte.

12 Claims, 5 Drawing Sheets

(56) References Cited

OTHER PUBLICATIONS

Authors—P. W. T. Lu and R. L. Ammon; titled "Sulfur Dioxide Depolarized Electrolysis for Hydrogen Production: Development Status"; from Int. J. Hydrogen Energy, vol. 7, No. 7, pp. 563-575; copyright 1982 International Association for Hydrogen Energy; Pittsburgh, Pennsylvania; copy enclosed (13 pages).

Authors—John Staser, Ramaraja P Ramasamy, Premkumar Sivasubramanian, and John W Weidner; titled "Effect of Water on the Electrochemical Oxidation of Gas-Phase $SO_2$ in a PEM Electrolyzer for $H_2$ Production"; from Electrochemical and Solid-State Letters, 10 (11) pp. E17-E19; copyright 2007 The Electrochemical Society; Columbia, South Carolina; copy enclosed (3 pages).

Micropatent LLC; titled "MicroPatent PatSearch JP2006347841 A"; Website print out from http://www.micropat.com/perl/di/psrecord.pl?ticket=234962799210&listid=1194020090804; visited Aug. 4, 2009; copyright Micropatent LLC; Connecticuit, USA; copy enclosed (1 page).

* cited by examiner

METHOD TO PREVENT SULFUR ACCUMULATION IN MEMBRANE ELECTRODE ASSEMBLY

CROSS REFERENCE TO RELATED APPLICATION

This application claims the benefit of U.S. Application Ser. No. 61/335,457 filed on Jan. 7, 2010 and entitled, "Method to Prevent Sulfur Accumulation Inside Membrane Electrode Assembly." U.S. Application Ser. No. 61/335,457 is incorporated by reference herein in its entirety for all purposes.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

The present invention relates generally to the generation of hydrogen. More particularly, the present application involves a process for the reduction or elimination of a sulfur layer in membrane electrode assemblies used in hybrid sulfur cycle electrolyzers.

BACKGROUND

Hydrogen can be produced in a hybrid sulfur cycle that utilizes an electrolyzer cell that has both an anode and a cathode. The hybrid sulfur cycle is a hybrid thermochemical cycle that can be used in conjunction with advanced nuclear reactors or centralized solar receivers to produce hydrogen by water splitting. The hybrid sulfur cycle uses high temperature, usually greater than 800° Celsius, thermal decomposition of sulfuric acid to produce oxygen and regenerate sulfur dioxide. The hybrid sulfur cycle is capable of generating hydrogen in a water electrolyzer at voltages lower than other methods such as conventional water electrolysis.

Sulfur dioxide and deionized water may be used as the anode reactants and can react at the anode to form sulfuric acid and protons (H+). The anode reaction may be: $SO_2$ (aq)+$2H_2O$ (aq)$\leftrightharpoons$$H_2SO_4$ (aq)+$2H^+$ (aq)+$2e^-$. The electrolyzer cell includes a membrane that allows the hydrogen ions produced at the anode to pass through. The membrane may allow the hydrogen ions to pass while preventing hydrogen gas, sulfuric acid, or other chemical species from passing through. The hydrogen ions can be used at the cathode reaction that may be $2H^+$ (aq)+$2e^-\rightarrow H_2$ (g). The hydrogen gas generated at the cathode can then be collected as desired. Water is generally introduced at the cathode to maintain hydration of this component. The hybrid sulfur cycle is capable of generating hydrogen at a much lower voltage than conventional electrolysis Although capable of producing hydrogen gas, without the disclosed methodology the use of an electrolyzer cell most likely requires a greater amount of voltage over time to drive the reaction. This increase in voltage is due to the formation of a sulfur layer between the cathode and the membrane. The presence of the sulfur layer adds ohmic resistance to the membrane electrode assembly, which increases cell voltage, and also presses the membrane electrode assembly into anode flow passages that increase pressure drop. Aside from increasing the voltage necessary to drive the production of hydrogen, the presence of the sulfur layer acts to delaminate the membrane electrode assembly and reduce the operational life of the apparatus. Hydrogen may be potentially used to replace gasoline as a transportation fuel and thus it may be necessary to generate millions of tons of hydrogen per year. Accordingly, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a method of operating a hybrid sulfur electrolyzer so that unwanted sulfur formation is either reduced or eliminated. The reduction or elimination of a sulfur layer allows the hybrid sulfur electrolyzer to operate to generate hydrogen without a significant increase in the voltage needed to drive the electrolyzer cell for such production. An associated apparatus is also provided.

Figure 1:
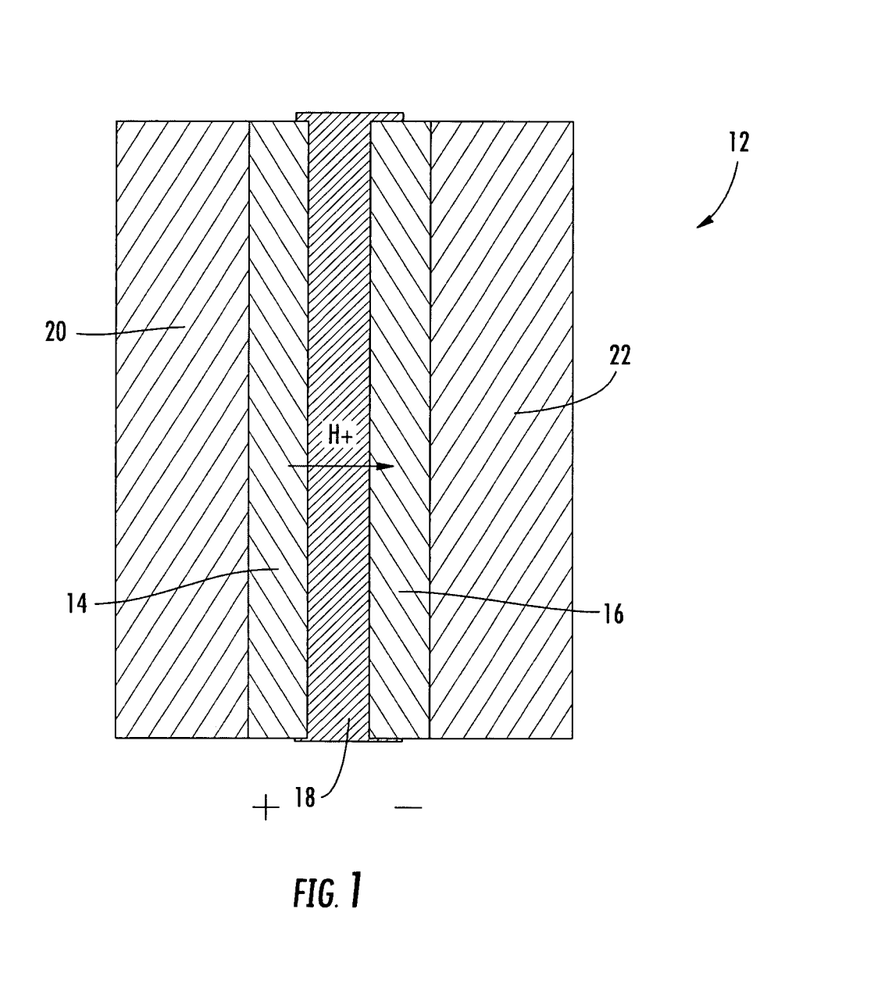
FIG. 1 is a schematic side view of an electrolyzer cell.

With reference now to FIG. 1, a single electrolyzer cell 12 is illustrated. The electrolyzer cell 12 may include a membrane electrode assembly (MEA) that includes a proton exchange membrane 18 surrounded on one side by a porous anode 14 that may be platinized carbon and on an opposite side by a porous cathode 16 that may be platinized carbon. The proton exchange membrane 18 may be made of a variety of materials and may be NAFION® 115 in certain exemplary embodiments that is a sulfonated tetrafluoroethylene based fluoropolymer-copolymer provided by E.I. du Pont de Nemours and Company and obtainable from Ion Power, Inc. having offices located at 720 Governor Lea Road, New Castle, Del., USA. In other exemplary embodiments, the proton exchange membrane 18 may be NAFION® 117, or other materials.

In addition to the MEA, an anolyte flowfield 20 (usually graphite) may include sulfur dioxide, water, and sulfuric acid that can be reacted at the anode 14 to generate hydrogen ions ($H^+$) that pass through the proton exchange membrane 18. The anolyte 20 may be 30% by weight of sulfuric acid in certain arrangements. In other configurations, the anolyte 20 may be 40% by weight of sulfuric acid, and in yet other arrangements the anolyte 20 may be 50% by weight of sulfuric acid.

The catholyte flowfield 22 (usually graphite) may include water that is used to hydrate the cathode 16 and that can be reacted at the cathode 16 to form hydrogen. Hydrogen and sometimes hydrogen sulfide and/or sometimes sulfur may be formed at the cathode 16. Although not shown, a layer of sulfur may be formed between the proton exchange membrane 18 and the cathode 16 as previously discussed which necessitates an increase in voltage necessary to drive the desired reaction and which may eventually delaminate or otherwise damage the electrolyzer cell 12. A typical voltage that may be applied to the electrolyzer cell 12 during a hybrid sulfur cycle may be 0.7 volts, although other voltages may be used in other arrangements such as those from 0.1-1.0 volts, from 1.0-1.3 volts, from 1.3-1.6 volts, and up to 1.6 volts. The consumption of sulfur dioxide at the anode 14 is proportional to the current density of the electrolyzer cell 12, and two moles of electrons consume one mole of sulfur dioxide.

Applicants theorize that the sulfur layer is formed between the proton exchange membrane 18 and the cathode 16 by way of a pair of chemical reactions. The first reaction is energetically preferred and forms hydrogen sulfide and is $SO_2+3H_2=H_2S+2H_2O$. The second reaction forms elemental sulfur and is $2H_2S+SO_2=3S+2H_2O$. As such, it is theorized that sulfur dioxide crosses the proton exchange membrane 18 to result in the formation of sulfur as per these two equations. The sulfur layer may become thicker or larger over time thus causing the necessary voltage to likewise increase over time due to the increasing thickness of the sulfur layer.

Sulfur dioxide can cross the proton exchange membrane 18 from the anolyte flowfield 20 by way of a concentration gradient that drives sulfur dioxide from the anode 14 to the cathode 16. Additionally, sulfur dioxide may dissolve in water and can be transported by the flux of water through the proton exchange membrane 18 which can be in either direction. Water flux may have three components. First, electro-osmotic drag will drive water from the anode 14 to the cathode. Second, the concentration gradient of water will drive water from the cathode 16 to the anode 14 because the anolyte 20 is typically a mixture of sulfuric acid and water, while pure water is supplied to the cathode 16. Third, the pressure gradient across the proton exchange membrane 18 may drive water in either direction. As such, depending upon conditions at the electrolyzer cell 12, sulfur dioxide can be transferred to the cathode 16 and the two aforementioned chemical reactions may take place to form the sulfur layer.

Applicants further theorize that limiting the concentration of sulfur dioxide at the interface between the proton exchange membrane 18 and the cathode 16 would result in all of the sulfur dioxide at the interface being consumed in the first reaction, since it is energetically preferred, thus leaving no sulfur dioxide present to participate in the second reaction which actually forms the sulfur. Although described as forming between the proton exchange membrane 18 and the cathode 16, it is to be understood that sulfur may form at other portions of the electrolyzer cell 12 and that the disclosed method of reducing sulfur is not limited to simply reduction or elimination between the proton exchange membrane 18 and the cathode 16. Sulfur formation at other portions, for example near the cathode flowfield 22, may be a nuisance and hurt process efficiency but may not result in damage to the electrolyzer cell 12.

Figure 2:
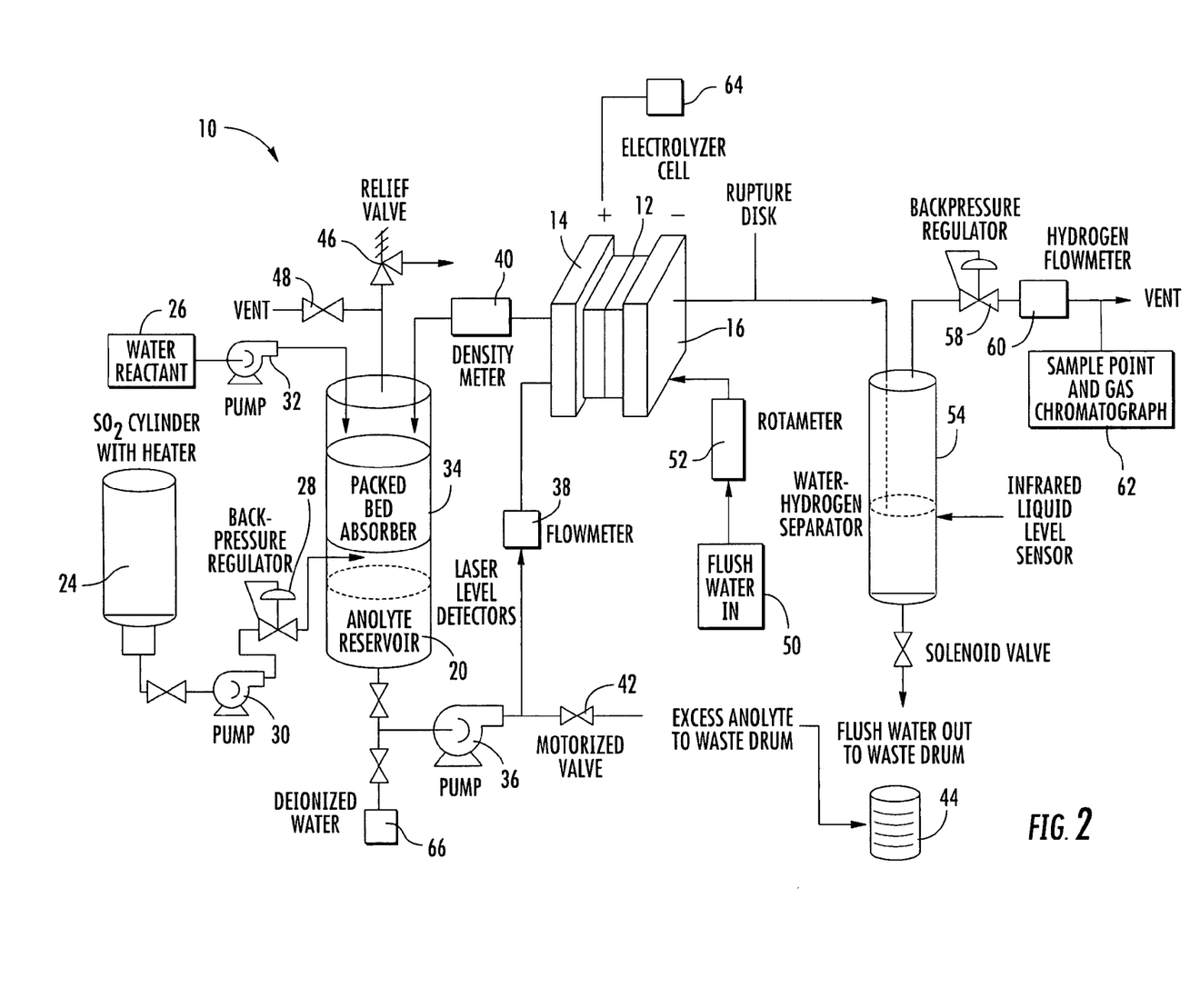
FIG. 2 is a schematic view of a hybrid sulfur electrolyzer facility used in accordance with one exemplary embodiment.

With reference now to FIG. 2, a hybrid sulfur electrolyzer test facility 10 is illustrated that was used to demonstrate an embodiment of the disclosed method. This test facility 10 was built to operate a simple electrolyzer containing a single electrolyzer cell 12 with associated electrical terminals and structural components. The hybrid sulfur electrolyzer test facility 10 may be used to demonstrate the method disclosed and facilitate the understanding of same.

The hybrid sulfur electrolyzer test facility 10 was designed to operate at pressures up to 6 atm and temperatures up to 80° Celsius, and at electrolyzer currents up to 120 amperes. However, it is to be understood that different operating conditions can be used if desired. A current of up to 120 amperes is sufficient to generate approximately 50 liters per hour of hydrogen. A sulfur dioxide cylinder 24 houses sulfur dioxide and was inverted and heated to 50° Celsius to increase its internal pressure so that liquid instead of vapor was transported to the sulfur dioxide pump 30. A backpressure regulator 28 downstream of the sulfur dioxide pump 30 was used to prevent flashing inside of the sulfur dioxide pump 30. The sulfur dioxide was introduced into an anolyte tank 34 and sulfur dioxide vapor was absorbed in anolyte in a packed bed filled with glass Raschig rings in the anolyte tank 34. The anolyte tank 34 had four laser level detectors attached thereon at different elevations to signal a low alarm, low operate, high operate, and high alarm states.

Deionized water 26 was supplied to the hybrid sulfur electrolyzer test facility 10 and was pumped to the anolyte tank 34 by way of a water pump 32. The anolyte 20 in the anolyte tank 34 was pumped to the electrolyzer cell 12 through the use of a gear pump 36. In accordance with other exemplary embodiments, the gear pump 36 need not be present. In yet other arrangements, the gear pump 36 may be replaced with another pumping device or arrangement and need not be a gear pump. The flow of anolyte 20 from the anolyte tank 34 to the electrolyzer cell 12 was measured by a magnetic flowmeter 38 that is located downstream of the gear pump 36. Anolyte 20 exiting the electrolyzer cell 12 passed through a density meter 40 and back to the anolyte tank 34. A data acquisition system that monitors the hybrid sulfur electrolyzer opened a motorized valve 42 downstream of the gear pump 36 when the level of anolyte 20 in the anolyte tank 34 reaches a high operate level, and closed the motorized valve 42 when the anolyte 20 drains down to low operate level. The excess anolyte 20 was drained to a waste drum 44 located outside of the building in which the remaining hybrid sulfur electrolyzer test facility 10 components were located. The anolyte tank 34 itself had a pressure relief valve 46 and vent 48 to relieve excess pressure therein.

The cathode 16 side of the electrolyzer cell 12 included a water source 50 that supplied a low flow of deionized water to the cathode 16 of the electrolyzer cell 12 to help maintain proton exchange membrane 18 hydration. The flow was 10 mL/min measured by a rotameter 52 located between the electrolyzer cell 12 and the water source 50.

Hydrogen and water exiting the cathode 16 entered the hydrogen-water separator 54. Water separated in the hydrogen-water separator 54 flowed out of the hydrogen-water separator 54 upon the opening of a solenoid valve 56 and to the previously mentioned waste drum 44. The solenoid valve 56 was actuated by way of an infrared liquid level sensor of the hydrogen-water separator 54. Hydrogen that is separated in the hydrogen-water separator 54 flowed through a back-pressure regulator 58 and mass hydrogen flowmeter 60 and subsequently past a gas chromatograph 62 and was then vented out of the building.

Figure 3:
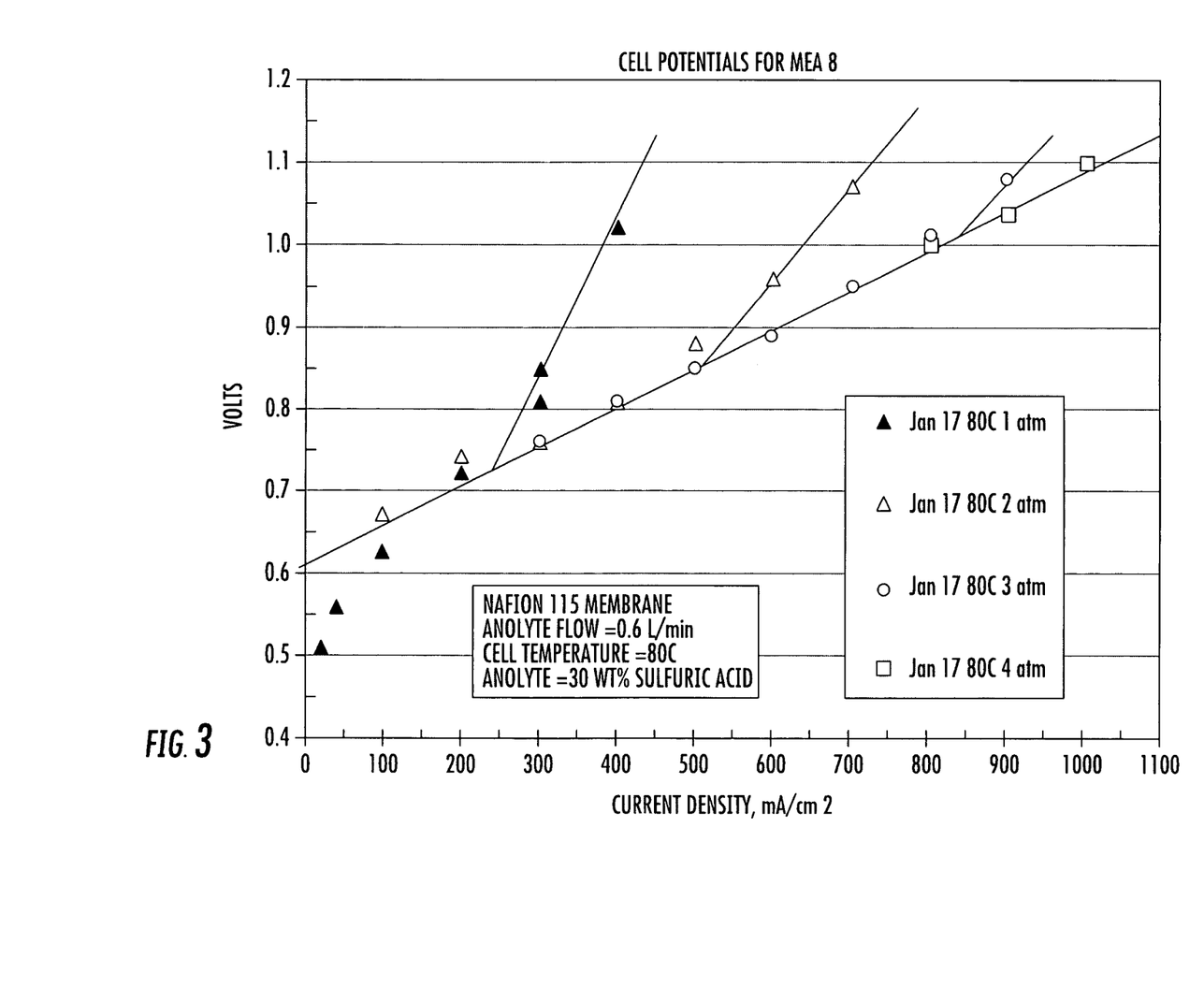
FIG. 3 is a graph of current density versus voltage for a range of pressures and current densities.

FIG. 3 is a plot of voltage and current density for four different anolyte 20 pressures obtained during one test run designated MEA 8. The anolyte 20 was 30% weight sulfuric acid and was at 80° Celsius in the reaction and included a sulfur dioxide concentration of 0.14 molar at 1 atm, 0.37 molar at 2 atm, 0.61 molar at 3 atm, and 0.85 molar at 4 atm. An increase in pressure of the anolyte 20 results in an increase in the amount of sulfur dioxide present in the anolyte 20. At 4 atm, the highest concentration of sulfur dioxide illustrated, the graph shows a line with an intercept at 0.61 volts and a slope of 0.49 $\Omega$-cm$^2$ and no data points indicate a mass transfer limitation. The reduction of pressure to 3 atm caused a corresponding decrease in the amount of sulfur dioxide present in the anolyte 20 as previously discussed. However, the voltage necessary to drive the reaction was not affected until current densities were greater than 850 mA/cm$^2$. This point represents a point of mass transfer limitation and thus a higher amount of voltage is necessary to achieve the production of hydrogen through the disclosed reaction.

Reduction of the pressure from 3 atm to 2 atm causes a corresponding decrease in the amount of sulfur dioxide present in the anolyte 20. Again, the voltage necessary to maintain the reaction is the same except for those current densities greater than 500 mA/cm$^2$. Further reduction of the pressure to 1 atm causes the necessary voltage to diverge from linear upwards upon the application of current densities greater than 250 mA/cm$^2$. Interpretation of the data indicates that a certain concentration of sulfur dioxide is necessary as a reactant for the anode 14 reaction to take place at a particular rate, and the necessary concentration of sulfur dioxide depends on the current. If the current is increased, the reaction rate is likewise increased and this requires an increase in the necessary concentration of sulfur dioxide. If less concentration of sulfur dioxide is provided than the particular necessary level, the electrolyzer cell 12 voltage increases because the reaction is limited. If a greater amount of concentration of sulfur dioxide than is necessary is provided, there is no effect on the electrolyzer cell 12 voltage that is needed. The divergent lines from the linear line representing 4 atm pressure thus mark where an insufficient amount of sulfur dioxide is present.

The formation of a sulfur layer between the cathode 16 and the proton exchange membrane 18 may be limited by reducing the amount of sulfur dioxide in the anolyte 20. This may be seen as previously discussed with respect to the two reactions that result in the formation of sulfur in that if all of the sulfur dioxide is burned up in the first reaction, which is energetically favored, none will be left for the second reaction that actually forms elemental sulfur. Since a limited supply of sulfur dioxide is present, there will be none left over after the energetically favored first reaction. However, as illustrated with respect to FIG. 3, reducing the amount of sulfur dioxide to a particular point will cause the electrolyzer cell 12 voltage to increase—which detracts from the benefit of using a hybrid sulfur electrolyzer.

Another strategy to reduce the concentration of sulfur dioxide is to increase the current density to consume more sulfur dioxide at the anode 14. However, the increase of current density causes the reaction to occur faster which causes more hydrogen to be produced but necessarily causes the electrolyzer cell 12 voltage to increase as well, which again detracts from the benefits of using a hybrid sulfur electrolyzer.

Additional means of reducing the concentration of sulfur dioxide at the interface involves increasing the net water flux from the cathode 16 to the anode 14. The increase of water flux in this direction, however, may interfere with hydrogen ion diffusion through the proton exchange membrane 18 and again lead to increased electrolyzer cell 12 voltage. A still further solution may be to decrease the permeability of the proton exchange membrane 18 to sulfur dioxide. However, if the proton exchange membrane 18 were made less permeable to sulfur dioxide, it may also be less permeable to hydrogen ions.

Figure 4:
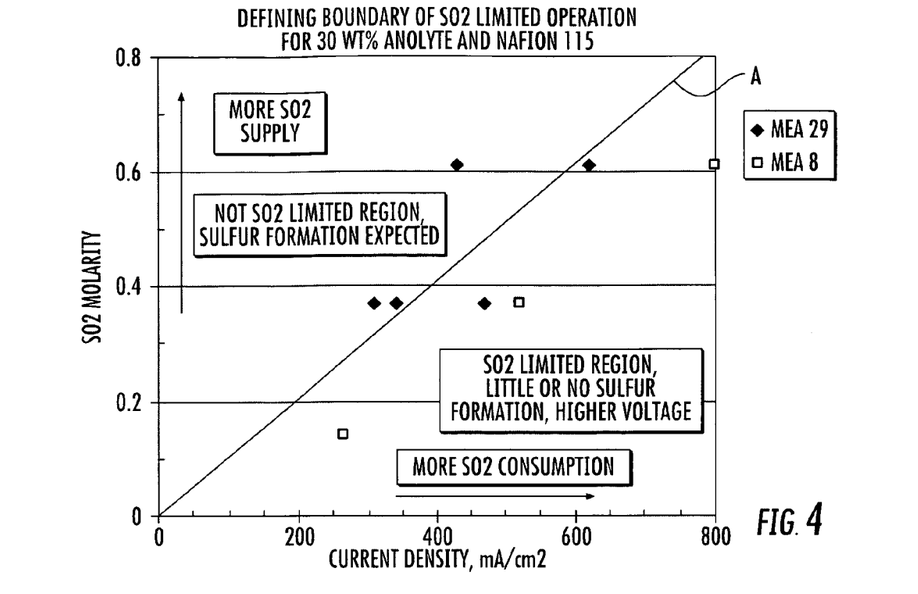
FIG. 4 is a graph of current density versus sulfur dioxide molarity for different test runs in which a boundary line A is established in accordance with one exemplary embodiment.

FIG. 4 includes a plot of the three current densities in the branch points (deviation from linear behavior) of FIG. 3 against their corresponding molarities of sulfur dioxide. These data points are labeled as MEA 8 in FIG. 4 which was simply data gathered in a test of the hybrid sulfur electrolyzer. Similarly, a separate test of the hybrid sulfur electrolyzer designated MEA 29 under different conditions yielded another set of data plotted in FIG. 4. Although there is significant scatter in the data, they suggest proportionality between sulfur dioxide molarity and mass transfer limited current density. A line labeled "A" was plotted on FIG. 4 that passes through the origin and between the data points. The anode 14 reaction was mass transfer limited for points below the boundary line A and thus represent reaction conditions in which an increased amount of voltage is necessary. The further below the boundary line A the reaction was commenced the higher the amount of voltage was needed to form hydrogen, and this increase may be in proportion to distance below the boundary line A. However, sulfur formation was less likely.

At points above boundary line A in FIG. 4, the anode 14 reaction was not mass transfer limited. Movement further above the boundary line A does not change the amount of necessary electrolyzer cell 12 voltage, but it is theorized that sulfur formation is more likely and faster the higher above the boundary line A the reaction is run.

As used herein, the term "current density" refers to current per area. The area that is used is the area of either the cathode 16 or the anode 14, since they can be the same area in certain embodiments. The current may be expressed in mA and the area of the cathode 16 or anode 14 may be expressed in cm$^2$. As such, the current density may be the current applied to the electrolyzer cell 12 in mA divided by the area of the anode 14 expressed in cm$^2$. As used herein molarity may be the moles of solute divided by the volume of anolyte in liters. As such, SO$_2$ molarity as discussed and as identified on the various figures may be the moles of SO$_2$ divided by the volume of the anolyte 20 in liters.

Boundary line A may have a slope of 0.001 and thus may increase 0.2 SO$_2$ molarity per every 200 mA/cm$^2$ increase in current density. The slope may be defined as being the increase of line A over the run which is 0.2/200=0.001. The Boundary line A may pass through the origin at 0 SO$_2$ molarity and 0 mA/cm$^2$ current density. The boundary line A can be a linear line and thus describe a linear relationship between the current density and the SO$_2$ molarity. Data points read off of the graph of FIG. 4 can indicate that the boundary line A has coordinates of current density in mA/cm$^2$ to SO$_2$ molarity of 200 to 0.2, 400 to 0.4, 600 to 0.6, and 800 to 0.8.

In order to further explain or define the boundary line A, the equation of boundary line A will now be discussed. The equation of a linear line is set forth as y=mx+b in which m is the slope of the line, b is the intercept of the line on the y-axis, and in which x and y are respective x and y coordinates of a point on the line. The boundary line A in FIG. 4 thus has an equation in which m=0.001 and in which b=0 because the boundary line A travels through the origin of the graph and thus intercepts the y-axis at 0. The equation of boundary line A in FIG. 4 is y=0.001x.

Figure 5:
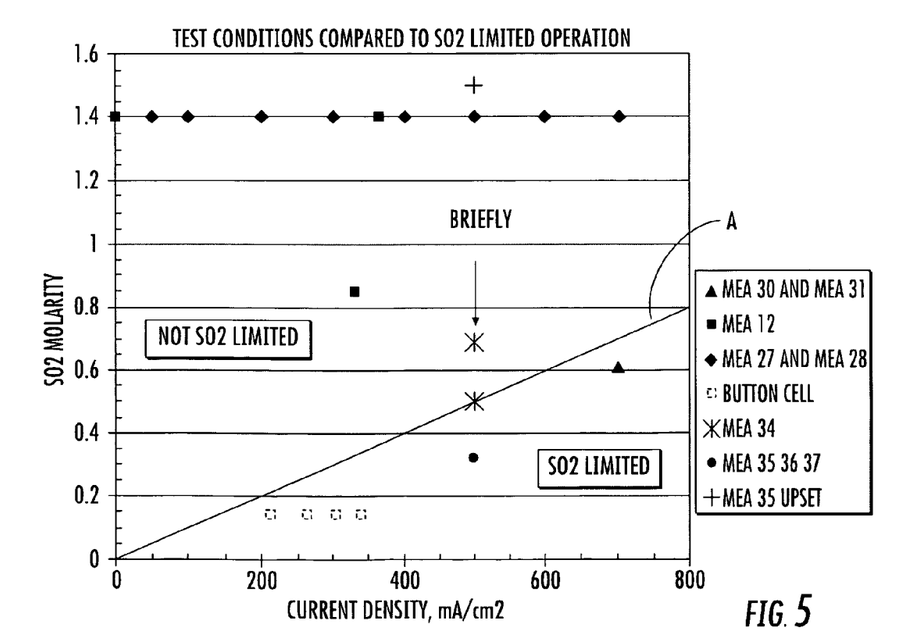
FIG. 5 is a graph of current density versus sulfur dioxide molarity for different test runs in which a boundary line is established in accordance with one exemplary embodiment.

FIG. 5 is a plot similar to FIG. 4 but of different test runs as disclosed in the legend of FIG. 5. "MEA" in the figures stands for membrane electrode assembly and the different numbers represents different test runs that may have different equipment and/or different testing conditions such as different anolyte 20 flow rates, different temperatures, etc. Boundary line A was plotted on FIG. 5 and represents the same demarcation points as previously discussed with respect to boundary line A of FIG. 4 in which operation below the boundary line A made sulfur formation unlikely but causes an increase in voltage the further the operation was below boundary line A. Electrolyzers operated below boundary line A did not have sulfur buildup between the proton exchange membrane 18 and cathode 16. Electrolyzer MEA 34 which was operated only briefly above boundary line A had very little sulfur buildup.

Likewise, operation above boundary line A did not cause a disproportionate increase in voltage due to mass transfer limitation, but did cause it to be more likely that sulfur formation would occur. Boundary line A in FIG. 5 may have a slope of 0.001 and can pass through the origin and have the same coordinates and equation as boundary line A as previously described with respect to FIG. 4.

It is therefore the case that the hybrid sulfur electrolyzer 10 may be operated at conditions that are just below the boundary lines A in FIG. 4 or 5 so that the amount of electrolyzer cell 12 voltage is, at most, slightly increased but yet so that sulfur formation is greatly reduced or eliminated. The hybrid sulfur electrolyzer may be operated so that operation is below the boundary line A not only during steady state production, but also during startup and shutdown. During steady state generation of hydrogen, the hybrid sulfur electrolyzer may be operated in the region below boundary line A so that at no time during steady state generation the operational plot crosses over boundary line A into the upper region in which sulfur formation is expected. In other arrangements, operation in the lower region without at any time ever crossing boundary line A may exist during all phases and at all times of operation of the hybrid sulfur electrolyzer such as start up, steady state generation, and shut down. The boundary line A, although linear, may be non-linear in other exemplary embodiments.

Figure 6:
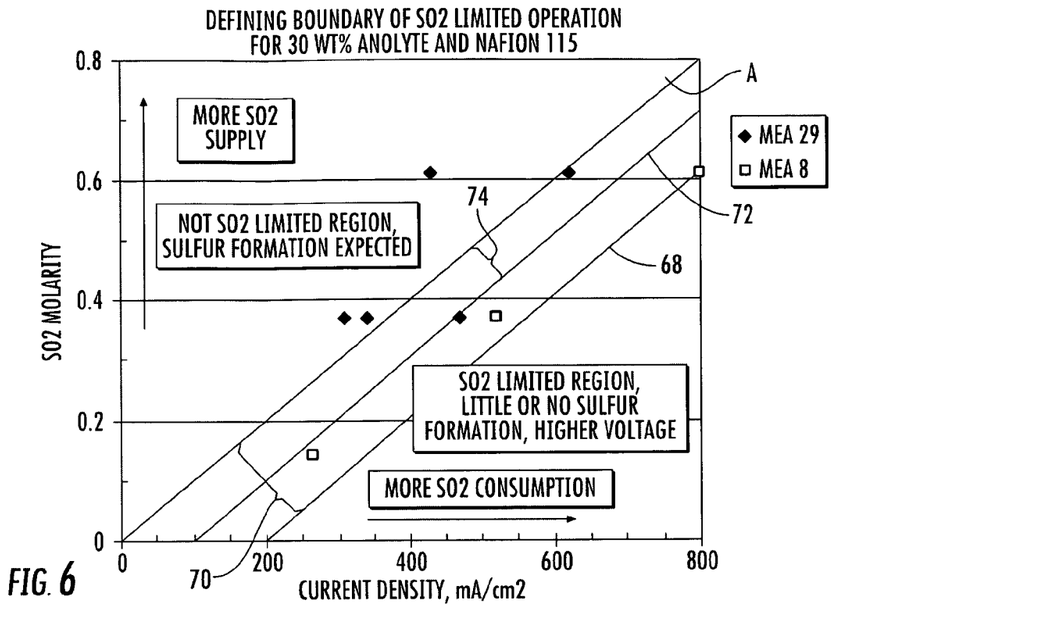
FIG. 6 is a graph similar to that of FIG. 4 with the addition of first and second operating lines.

FIG. 6 is a graph similar to FIG. 4 in which the boundary line A is plotted. In accordance with one exemplary embodiment, the hybrid sulfur electrolyzer can be run such that the current density and $SO_2$ molarity are plotted and are below the boundary line A but on or above a first operating line 68. The first operating line 68 can have an equation that is y=0.001x−0.2. As such, the hybrid sulfur electrolyzer can function within an operating range 70. Functioning within the operating range 70 will minimize or prevent the formation of sulfur yet not significantly increase the amount of voltage used in the generation of the hydrogen. Stated yet another way, the first operating line 68 is a linear line that passes the x-axis at a current density of 200 mA/cm$^2$ and is parallel to boundary line A and includes data points that are 0.2 $SO_2$ molarity below that of boundary line A when the exact same current density is present between boundary line A and first operating line 68.

Also disclosed on FIG. 6 is a second operating line 72 that has an equation of y=0.001x−0.1. The hybrid sulfur electrolyzer can be operated so that the current density and $SO_2$ molarity that are used are at or above the second operating line 72 yet below the boundary line A. The boundary line A and the second operating line 72 thus define an operating range 74 that is the area between these two lines. Operating range 74 is smaller than operating range 70 and thus operation within operating range 74 but not within operating range 70 will generally allow for operation in which sulfur is not formed and in which voltage used is lower. Stated yet another way, the second operating line 72 is a linear line that passes the x-axis at a current density of 100 mA/cm$^2$ and is parallel to boundary line A and includes data points that are 0.1 $SO_2$ molarity below that of boundary line A when the exact same current density is present between boundary line A and second operating line 72. Although only a pair of operating lines are illustrated, it is to be understood that additional operating lines may be present to include various ranges of operation below the boundary line A in accordance with other exemplary embodiments.

In certain exemplary embodiments, one of the operating lines such as the first operating line 68 may be defined so that it has a slope that is the same as that of the boundary line A. The first operating line 68 may extend through the data point that is farthest from the boundary line A (for example, data point 800, 0.61 in FIG. 6). The boundary line A can be set using other methods in accordance with other exemplary embodiments.

Operation below the boundary line A may be effected during startup by loading fresh anolyte 20 with no sulfur dioxide. The power supply 64 of the hybrid sulfur electrolyzer is energized to impress 0.9 volts across the electrolyzer cell 12, and the anolyte 20 and the electrolyzer cell 12 are heated to a desired temperature of operation. The voltage of 0.9 volts is insufficient to accomplish conventional water electrolysis, for which the reversible cell voltage is 1.22 volts, and only traces of sulfur dioxide are present so electrolyzer cell 12 current is small. Although described as being 0.9 volts, in other arrangements, the hybrid sulfur electrolyzer is energized to impress any voltage less than 1.22 volts.

Figure 7:
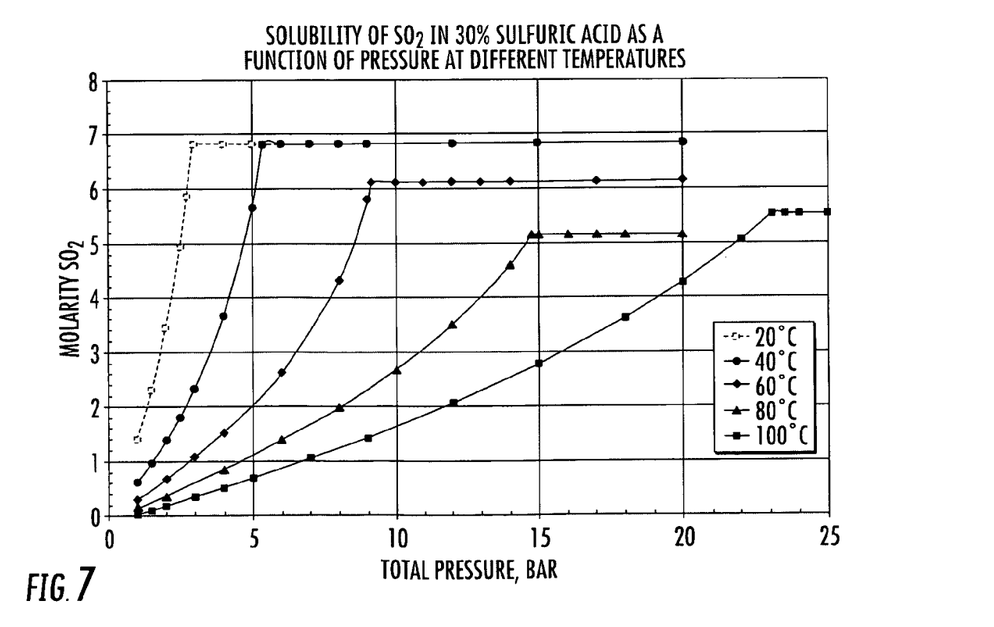
FIG. 7 is a graph of pressure versus sulfur dioxide molarity for 30% sulfuric acid at various temperatures.

Next, sulfur dioxide is slowly added, and this addition increases anolyte 20 pressure, the concentration of sulfur dioxide in the anolyte 20, and the current density of the reaction. The amount of sulfur dioxide concentration may then be noted. FIG. 7 is a graph that allows for conversion of anolyte 20 temperature and pressure to sulfur dioxide concentration, listed as molarity $SO^2$, for 30 weight percent sulfuric acid. If the weight percent is different, for example for 40 weight percent sulfuric acid or for 50 weight percent sulfuric acid, then a different graph should be consulted to ascertain the amount of sulfur dioxide concentration. Upon noting the amount of sulfur dioxide concentration, the user may verify that the transition conditions remain below the boundary line A.

Once the target current is reached, the power supply 64 can be changed to current control and thereafter the voltage will decrease. In accordance with certain exemplary embodiments, the target current may be set so that a current density of 500 mA/cm$^2$ is realized. However, the target current may be set at other levels in accordance with various exemplary embodiments. If an increase in sulfur dioxide concentration does not decrease the electrolyzer cell 12 voltage, then the sulfur dioxide concentration can be decreased until the first indication of an increase in electrolyzer cell 12 voltage. Stated another way, the start up conditions cause the electrolyzer cell 12 to function below the boundary line A. Once the amount of cell voltage is noted as not decreasing while the amount of sulfur dioxide concentration is increased, the electrolyzer cell 12 may be deemed to be at the boundary line A. The user can then simply decrease the amount of sulfur dioxide while maintaining the same current density. At the first indication of a voltage increase the amount of sulfur dioxide concentration can be maintained and the hybrid sulfur electrolyzer is now operating at a location just under the line A so that voltage increase is minimal while sulfur buildup is decreased or eliminated.

Shutdown of the hybrid sulfur electrolyzer may be conducted in such a manner that the operating conditions are below the line A. In this regard, the current and operating temperature of the electrolyzer cell 12 can be maintained while the supply of sulfur dioxide is stopped which slowly decreases anolyte 20 pressure. Venting of sulfur dioxide vapor to accelerate the pressure decrease is not normally done because it may cause the gear pump 36 to vapor lock. However, in other exemplary embodiments, sulfur dioxide vapor may be vented. The reduction of pressure decreases the concentration of sulfur dioxide which in turn causes the voltage of the electrolyzer cell 12 to increase so that the reaction is maintained. In this regard, the operational state is moving vertically downward on FIGS. 4 and 5 without moving left or right.

Once the electrolyzer cell 12 voltage increases to 0.9 volt, the power supply 64 may be switched to voltage control at which time the current starts to decrease. Once the pressure of the anolyte 20 decreases to atmospheric, the power supply 64 and the gear pump 36 are simultaneously de-energized while allowing the cathode 16 flush to continue. The valve of the anolyte tank 34 is closed to prevent anolyte 20 flow, and the anode 14 of the electrolyzer cell 12 is flushed with deionized water 66. The cathode 16 and anode 14 of the electrolyzer cell 12 are stored in water. This shut down procedure causes the operational point of the hybrid sulfur electrolyzer to be below the line A thus preventing or reducing the formation of sulfur at the electrolyzer cell 12.

Although described as including certain start up and shut down sequences, it is to be understood that other exemplary embodiments are possible in which different start up and/or shut down procedures are used. Further, other arrangements exist in which the start up and/or shut down procedure causes operation above the line A.

Operation of the hybrid sulfur electrolyzer below the line A may affect the cathode 16 chemistry which in turn may increase the corrosion rates in elements proximate to the cathode 16 constructed of 316 stainless steel. In order to prevent this corrosion, all piping between the electrolyzer cell 12 and the hydrogen-water separator 54, in addition to the solenoid drain valve of the hydrogen-water separator 54, may be made or replaced with corrosion resistant plastics or plastic lined pipes or parts. The piping downstream of the hydrogen-water separator 54 through which the hydrogen flows may continue to be made of type 316 stainless steel as increased corrosion may not occur at these locations due to running in the disclosed operating conditions. The piping from the water source 50 to the electrolyzer cell 12 may be made of corrosion resistant plastic or plastic lined pipes or parts as well in certain exemplary embodiments.

A methodology is thus disclosed that allows one to operate a hybrid sulfur electyrolyzer with the formation of little or no sulfur in the electrolyzer cell 12 while at the same time only minimally increasing the voltage that the reaction requires. Although previously described with respect to the use of a proton exchange membrane 18 that is made of NAFION® 115 and 30% wt anolyte 20, the methodology disclosed can be used to establish the desired operating parameters when the anolyte 20 and/or the proton exchange membrane 18 are different. As such, it may be the case that the boundary line A previously disclosed is different when the proton exchange membrane 18 and/or anolyte 20 are different. The disclosed methodology will now be repeated for sake of clarity and completion so that one may derive operating parameters regardless of the composition of components such as the proton exchange membrane 18, anolyte 20, or other component of the hybrid sulfur electrolyzer.

First, the user may note the points of mass transfer limitation of the hybrid sulfur electrolyzer. This can be done, for example, upon the construction of a graph as set forth in FIG. 3 in which the current density versus voltage is plotted for an anolyte 20 at different pressures. As discussed, different pressures of the anolyte 20 causes the anolyte 20 have different $SO_2$ molarity. Once the graph is constructed, the mass transfer limitation points can be determined upon making note of where the lines diverge from linear as illustrated, for example, in FIG. 3. Although described in the specification and claims as "current density," it is to be understood that this term may include current in other exemplary embodiments and need not be expressed in terms of current per area. As such, it is to be understood that as used herein the term current density is broad enough to cover the term current as well.

Once the user has determined the points of mass transfer limitation, a plot of current density versus $SO_2$ molarity may be constructed using the points of mass transfer limitation as the data points. It is to be understood that the $SO_2$ molarity simply refers to the concentration of $SO_2$ and that what is being plotted is really the concentration of $SO_2$. As such, instead of $SO_2$ molarity the concentration may be expressed as grams per liter, pounds per gallon, etc. in accordance with other exemplary embodiments. A boundary line can then be plotted based upon the plotted data points. The boundary line can be plotted in a number of different ways. For example, the boundary line can be a line of best fit drawn on the graph in order to show a trend of the data points on the graph. The line of best fit may be calculated in a number of ways known in the art, for example a mathematical point slope formula can be used to obtain the line of best fit. The boundary line need not be linear in other embodiments and may be a parabola and thus can indicate a second power relationship. The boundary line can be made to be a line of best fit that is linear, polynomial, a power law, exponential, or any other form. In other arrangements, the boundary line can simply pass through all of the data points and need not be an average or approximation of the data. In this regard, the boundary line can be a series of straight lines that may have the same or different slopes. As such, any method of establishing a boundary line can be employed to interpret the data points. Therefore, it is to be understood that the boundary line, if linear, can have slopes other than 0.001, as disclosed previously, in other exemplary embodiments.

Next, the user can operate the hybrid sulfur electrolyzer so that the reaction is carried out on one side of the boundary line so that the formation of sulfur is minimized or eliminated. If the graph that was generated has current density on the x-axis and SO2 molarity on the y-axis, the reaction can be run at points just below the boundary line. Operation at these points will minimize or eliminate sulfur formation while only requiring a slight increase in voltage necessary to drive the reaction since operation will be $SO_2$ limited. An operating line may be established on the graph and the reaction can be run at points between the boundary line and the operating line. In one exemplary embodiment, the boundary line may be linear and the operating line can have the same slope but have a different y-intercept and can extend through the data point that is farthest from the boundary line on the side of the boundary line at which sulfur generation is reduced or eliminated. In other arrangements, the boundary line can be determined differently. The hybrid sulfur electrolyzer may be run at steady state so that the operating parameters are just below the boundary line, or the hybrid sulfur electrolyzer may be run so that its operating parameters are always just below the boundary line at all points in the process such as during start up, steady state production, and shut down.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The invention claimed is:

1. A method of operating a hybrid sulfur electrolyzer to generate hydrogen, consisting of:
providing an anolyte to an electrolyzer cell, wherein the anolyte has a concentration of sulfur dioxide; and
applying current to the electrolyzer cell such that a current density is established;
establishing and maintaining a steady state production of hydrogen generation in which a plot of the applied current density on an X-axis of a graph versus the concentration of sulfur dioxide on a Y-axis of the graph is below a boundary line on the graph, wherein the boundary line is linear and extends through an origin of the graph and has a slope of 0.001 in which the X-axis of the graph is current density measured in $mA/cm^2$ and the Y-axis of the graph is concentration of sulfur dioxide measured in moles of sulfur dioxide per liter of anolyte, wherein the steps of providing an anolyte and applying current occur during the steady state production of the hybrid sulfur electrolyzer, and a start up sequence consisting of:
loading anolyte that does not have any concentration of sulfur dioxide into an anolyte tank;
impressing a voltage to the electrolyzer cell that is less than that needed to accomplish water electrolysis of hydrogen;
heating the electrolyzer cell and the anolyte;
slowly adding sulfur dioxide to the anolyte such that anolyte pressure is increased and concentration of sulfur dioxide in the anolyte is increased;
obtaining the amount of concentration of the sulfur dioxide in the anolyte by use of the temperature and pressure of the anolyte, wherein the plot of the applied current density on the X-axis of the graph versus the concentration of sulfur dioxide on the Y-axis of the graph is below the boundary line;
changing a power supply to the electrolyzer cell to current control once a target current is reached; and
decreasing the concentration of sulfur dioxide in the anolyte until the first indication of an increase in voltage in the electrolyzer cell, wherein the decreasing step is performed only if an increase in concentration of sulfur dioxide in the anolyte does not cause a decrease in voltage of the electrolyzer cell.

2. The method of operating a hybrid sulfur electrolyzer as set forth in claim 1, wherein the anolyte has water and wherein 30% of the weight of the anolyte is sulfuric acid, and wherein the electrolyzer cell has a proton exchange membrane that is made of a sulfonated tetrafluoroethylene fluoropolymer copolymer.

3. The method of operating a hybrid sulfur electrolyzer as set forth in claim 1, wherein an equation of the boundary line on the graph is $y=0.001x$, and wherein at all times during steady state production of hydrogen a plot of the applied current density on the X-axis of the graph versus the concentration of sulfur dioxide on the Y-axis of the graph is below the boundary line and on or above an operating line on the graph, wherein the operating line is linear and wherein the equation of the operating line on the graph is $y=0.001x-0.2$.

4. The method of operating a hybrid sulfur electrolyzer as set forth in claim 1, wherein the equation of the boundary line on the graph is $y=0.001x$, and wherein at all times during steady state production of hydrogen a plot of the applied current density on the X-axis of the graph versus the concentration of sulfur dioxide on the Y-axis of the graph is below the boundary line and on or above an operating line on the graph, wherein the operating line is linear and wherein the equation of the operating line on the graph is $y=0.001x-0.1$.

5. The method of operating a hybrid sulfur electrolyzer as set forth in claim 1, wherein the steps of providing an anolyte and applying current occur during the steady state production of the hybrid sulfur electrolyzer, and further consisting of a shut down sequence of:
stopping a supply of sulfur dioxide to the anolyte while current to the electrolyzer cell and temperature are maintained such that the pressure of the anolyte is slowly decreased, wherein the pressure reduction causes the voltage supplied to the electrolyzer cell to increase, and wherein the pressure reduction of the anolyte is associated with a decrease in the concentration of sulfur dioxide of the anolyte;
switching a power supply to the electrolyzer cell to voltage control when the voltage of the electrolyzer cell increases to a threshold level;
de-energizing the power supply and an anolyte pump simultaneously when the pressure of the anolyte decreases to atmospheric, wherein upon de-energizing a water flush of a cathode of the electrolyzer cell continues;
closing a valve at an anolyte tank such that the supply of anolyte to the electrolyzer cell is shut off;
flushing an anode of the electrolyzer cell with deionized water; and
storing the cathode side and the anode side of the electrolyzer cell in water.

6. The method of operating a hybrid sulfur electrolyzer as set forth in claim 5, wherein the threshold level is 0.9 volt.

7. A method of operating a hybrid sulfur electrolyzer to generate hydrogen, consisting of:
loading anolyte that does not have any concentration of sulfur dioxide into an anolyte tank;
impressing a voltage of 0.9 volt to the electrolyzer cell;
heating the electrolyzer cell and the anolyte;
slowly adding sulfur dioxide to the anolyte such that anolyte pressure is increased and concentration of sulfur dioxide in the anolyte is increased;
obtaining the amount of concentration of the sulfur dioxide in the anolyte by use of the temperature and pressure of the anolyte, wherein the plot of the applied current density and concentration of sulfur dioxide does not cross over the boundary line during the entire start up sequence;
changing a power supply to the electrolyzer cell to current control once a target current is reached;
decreasing the concentration of sulfur dioxide in the anolyte until the first indication of an increase in voltage in the electrolyzer cell, wherein the decreasing step is performed only if an increase in concentration of sulfur dioxide in the anolyte does not cause a decrease in voltage of the electrolyzer cell; and, running at steady state production of hydrogen generation with respect to a boundary line on a graph that has on its axes current density and concentration of sulfur dioxide, wherein the boundary line is linear and extends through an origin of the graph and has a slope of 0.001 in which the X-axis of the graph is current density measured in $mA/cm^2$ and the Y-axis of the graph is concentration of sulfur dioxide measured in moles of sulfur dioxide per liter of anolyte, wherein during the steady state production of hydrogen generation a plot of the current density and concentration of sulfur dioxide does not cross over the boundary line, wherein the boundary line separates a region on the graph where sulfur formation in the electrolyzer cell is expected from a region on the graph where sulfur formation in the electrolyzer cell is not expected or only minimally expected but where higher voltages are needed to generate hydrogen.

8. The method of operating a hybrid sulfur electrolyzer as set forth in claim 7, wherein the equation of the boundary line on the graph is $y=0.001x$, and wherein at all times during steady state production of hydrogen of the applied current density on the X-axis of the graph versus the concentration of sulfur dioxide on the Y-axis of the graph is below the boundary line and on or above an operating line on the graph, wherein the operating line is linear and wherein the equation of the operating line on the graph is $y=0.001x-0.2$.

9. The method of operating a hybrid sulfur electrolyzer as set forth in claim 7, wherein the equation of the boundary line on the graph is $y=0.001x$, and wherein at all times during steady state production of hydrogen a plot of the applied current density on the X-axis of the graph versus the concentration of sulfur dioxide on the Y-axis of the graph is below the boundary line and on or above an operating line on the graph, wherein the operating line is linear and wherein the equation of the operating line on the graph is $y=0.001x-0.1$.

10. The method of operating a hybrid sulfur electrolyzer as set forth in claim 7, wherein the anolyte has water and wherein 30% of the weight of the anolyte is sulfuric acid, and wherein the electrolyzer cell has a proton exchange membrane that is made of a sulfonated tetrafluoroethylene fluoropolymer copolymer.

11. The method of operating a hybrid sulfur electrolyzer as set forth in claim 7, wherein the plot of the applied current density and concentration of sulfur dioxide does not cross over the boundary line during the entire time of the running at steady state production of hydrogen generation, and during the entire time of a start up sequence of the hybrid sulfur electrolyzer, and during the entire time of a shut down sequence of the hybrid sulfur electrolyzer.

12. The method of operating a hybrid sulfur electrolyzer as set forth in claim 7, and further consisting of a shut down sequence consisting of:

stopping a supply of sulfur dioxide to the anolyte while current to the electrolyzer cell and temperature are maintained such that the pressure of the anolyte is slowly decreased, wherein the pressure reduction causes the voltage supplied to the electrolyzer cell to increase, and wherein the pressure reduction of the anolyte is associated with a decrease in the concentration of sulfur dioxide of the anolyte;

switching a power supply to the electrolyzer cell to voltage control when the voltage of the electrolyzer cell increases to 0.9 volt;

de-energizing the power supply and an anolyte pump simultaneously when the pressure of the anolyte decreases to atmospheric, wherein upon de-energizing a water flush of a cathode of the electrolyzer cell continues;

closing a valve at an anolyte tank such that the supply of anolyte to the electrolyzer cell is shut off;

flushing an anode of the electrolyzer cell with deionized water; and storing the cathode side and the anode side of the electrolyzer cell in water.

* * * * *